United States Patent Office 3,298,858
Patented Jan. 17, 1967

3,298,858
METHOD OF TREATING SURFACES OF IRON AND STEEL
Katsuyo Ashikari, Suginami-ku, Tokyo-to, Japan, assignor of one-half to Yawata Seitetsu Kabushiki Kaisha, Chiyoda-ku, Tokyo-to, Japan, a joint-stock company of Japan
No Drawing. Filed July 8, 1963, Ser. No. 293,244
3 Claims. (Cl. 117—107.2)

The present invention relates to the treatment of surfaces of iron and steel, and more particularly it relates to a new method of treating surfaces of iron and steel articles so as to greatly improve the physical, mechanical, and chemical properties of such surfaces.

More specifically, the present invention contemplates providing a method of treating surfaces of iron and steel comprising the following steps. First, one or more substances such as ferro-tungsten, ferro-molybdenum, ferro-chromium, ferro-titanium, ferro-tantalum, ferro-zirconium, and ferro-boron are rendered into fine particles (of approximately 1-micron particle size) by a fluid dynamical method (mechanical pulverization). A mixture is then prepared of these particles and certain quantities of one or more carbides such as tungsten carbide, titanium carbide, tantalum carbide, boron carbide, zirconium carbide, and molybdenum carbide, of one of more substances such as metallic nickel, metallic cobalt, metallic tungsten, metallic molybdenum, ammonium para-tungstate and ammonium molybdate. The mixture is prepared by mixing with an agitator for several hours and then is used as a diffusion agent. As a catalyst, an organic salt (for example, cobalt acetate, cobalt oxalate, etc.) is added to and used together with the above-described mixture. The article to be treated is buried in the powder mixture so formed, which is then heated for several hours under vacuum or in a reducing atmosphere at a temperature (800 to 1,300 degrees C.) which is equal to or higher than the transformation point of the article being treated. After this heating, cooling is carried out. Then heat hardening and tempering of the article are carried out in accordance with its time-temperature-transformation curve.

For a full understanding of the nature of the invention, the following description of the transformations occurring during the process according to the method of this invention is presented hereinbelow.

At a heating treatment temperature of 200 degrees C., a small quantity of metallic cobalt is activated and begins to diffuse in the article being treated and in the carbides and ferro-metals among the powder substances.

Next, at a heating temperature of 400 to 600 degrees C., the organic salt (cobalt oxalate or cobalt acetate, etc.) used as a catalyst begins to undergo thermal dissociation and is deposited as metallic cobalt on the surface of the article being treated.

Then, at a heating temperature of 800 to 1,000 degrees C., the ferro-metals and metal carbides among the powder substances undergo activated adsorption on the surface of the article and begin to diffuse in the cobalt which has been deposited, whereby, in conjunction with the mutual diffusion reaction, an alloy layer is formed on the surface of the article being treated. Then this alloy layer is diffused into the article by crystal movement and lattice defect due to the heating of the article.

In carrying the method of the present invention into practice, highly effective results are obtainable by burying the article to be treated in a penetrative treatment agent and subjecting the article in its state of being covered by the said agent to heat treatment in an inert atmosphere or under a high degree of vacuum.

In order to indicate still more fully the nature of the present invention, the following examples of typical procedure embodying the method of the invention are set forth, it being understood that these examples are presented as illustrative only, and that they are not intended to limit the scope of the invention.

Example 1

The constituents of the treatment mixture and their proportions are as follows:

|   | Grams |
|---|---|
| Ferro-tungsten powder | 100 |
| Ferro-molybdenum powder | 100 |
| Ferro-titanium powder | 100 |
| Tungsten carbide powder | 2 |
| Molybdenum carbide powder | 2 |
| Titanium carbide powder | 0.5 |
| Cobalt | 6 |
| Organic salt (cobalt acetate) | 10 |

The above powders are mixed for several hours by means of an agitator. The article to be treated is buried in the powder mixture so obtained and heated for two hours at 1,000 degrees C. in a high-frequency electric furnace ($N_2$ gas regulated). Then the furnace is cooled, after which quench hardening of the article is carried out at 980 degrees C., after which tempering in accordance with the purpose of the article is carried out. As a result of this treatment, the physical and mechanical properties of the surface of the article vary greatly, the hardness becoming approximately 70 Rockwell C or higher, and the corrosion resistance of the surface also increasing substantially.

Example 2

This example illustrates the case wherein the method of this invention is applied for the purpose of imparting ultra-heat-resistance against high temperatures to the article.

Valve seats and plunger pins of stainless steel (austenitic) were used as articles to be treated (treated materials). The treatment agent was composed of the following substances in the proportions indicated.

|   | Grams |
|---|---|
| Ferro-tungsten powder | 10 |
| Ferro-titanium powder | 100 |
| Ferro-zirconium powder | 30 |
| Titanium carbide powder | 5 |
| Zirconium carbide powder | 5 |
| Metallic cobalt | 5 |
| Metallic nickel | 5 |
| Cobalt oxalate | 3 |

The above powders were mixed together for several hours by means of an agitator. The aforementioned articles to be treated were buried in the powder mixture so obtained and heated for 10 hours at 1,100 degrees C. in an atmosphere of $N_2$ gas or $H_2$ gas. Then the articles were slowly cooled, after which heat treatment of the base metals was carried out to impart mechanical strength thereto.

Example 3

This example illustrates the case wherein the method of this invention is applied to bearings for special uses (that is, improvement of resistance to oxidation at high temperatures and of high-temperature strength of articles).

Bearings (made of a high-speed steel) for jet aircraft engines and missiles were treated by the method of this invention.

The treatment agent was composed of the following substances in the proportions indicated.

| | Grams |
|---|---|
| Ferro-boron powder | 20 |
| Ferro-chromium powder | 20 |
| Ferro-tungsten powder | 50 |
| Ferro-titanium powder | 100 |
| Ferro-zirconium powder | 30 |
| Titanium carbide, TiC | 20 |
| Tungsten carbide, WC | 20 |
| Metallic cobalt | 5 |
| Metallic nickel | 5 |

The above powders were mixed together for several hours by means of an agitator. The aforementioned articles to be treated were buried in the powder mixture so obtained and heated for several hours at 1,100 to 1,200 degrees C. in an atmosphere of $N_2$ or $H_2$ or under a vacuum. Then the furnace was slowly cooled, after which the base materials of the articles were heat treated in accordance with their respective T.T.T. curves. The surfaces so obtained were found to have ideal mechanical and chemical properties.

Although the present invention has been described with respect to particular embodiments thereof, it is not to be so limited as various changes and modifications can be made therein which are within the full intended scope of the invention, as defined by the appended claims.

What is claimed is:

1. A method of treating the surface of iron and steel articles which comprises: preparing, as a diffusion agent, a powder mixture of at least one ferro-metal selected from the group consisting of ferro-tungsten, ferro-molybdenum, ferro-chromium, ferro-titanium, ferro-tantalum, ferro-zirconium, and ferro-boron, at least one metal carbide selected from the group consisting of tungsten carbide, molybdenum carbide, titanium carbide, tantalum carbide, boron carbide, and zirconium carbide, and at least one substance selected from the group consisting of metallic nickel, metallic cobalt, metallic tungsten, metallic molybdenum, ammonium para-tungstate, and ammonium molybdate; adding an organic salt selected from the group consisting of cobalt acetate and cobalt oxalate, as a catalyst, to the said powder mixture; covering the surface of the article to be treated with the resulting powder mixture; and heat treating the said article, in the state of being so covered, at a temperature of 800 to 1,300 degrees C. under a reducing atmosphere.

2. A method of treating the surface of iron and steel articles which comprises: preparing, as a diffusion agent, a powder mixture of at least one ferro-metal selected from the group consisting of ferro-tungsten, ferro-molybdenum, ferro-chromium, ferro-titanium, ferro-tantalum, ferro-zirconium, and ferro-boron, at least one metal carbide selected from the group consisting of tungsten carbide, molybdenum carbide, titanium carbide, tantalum carbide, boron carbide, and zirconium carbide, and at least one substance selected from the group consisting of metallic nickel, metallic cobalt, metallic tungsten, metallic molybdenum, ammonium para-tungstate, and ammonium molybdate; adding an organic salt selected from the group consisting of cobalt acetate and cobalt oxalate, as a catalyst, to the said powder mixture; covering the surface of the article to be treated with the resulting powder mixture; and heat treating the said article, in the state of being so covered, at a temperature of 80 to 1,300 degrees C. in an inert atmosphere.

3. A method of treating the surface of iron and steel articles which comprises: preparing, as a diffusion agent, a powder mixture of at least one ferro-metal selected from the group consisting of ferro-tungsten, ferro-molybdenum, ferro-chromium, ferro-titanium, ferro-tantalum, ferro-zirconium, and ferro-boron, at least one metal carbide selected from the group consisting of tungsten carbide, molybdenum carbide, titanium carbide, tantalum carbide, boron carbide, and zirconium carbide, and at least one substance selected from the group consisting of metallic nickel, metallic cobalt, metallic tungsten, metallic molybdenum, ammonium para-tungstate, and ammonium molybdate; adding an organic salt selected from the group consisting of cobalt acetate and cobalt oxalate, as a catalyst, to the said powder mixture; covering the surface of article to be treated with the resulting powder mixture; and heat treating the said article, in the state of being so covered, at a temperature of 80 to 1,300 degrees C. under a vacuum.

References Cited by the Examiner

UNITED STATES PATENTS

| 2,292,694 | 8/1942 | Jerabek | 117—22 X |
| 2,512,455 | 6/1950 | Alexander | 117—22 X |
| 2,622,043 | 12/1952 | Roush | 117—107.2 |
| 2,755,199 | 7/1956 | Rossheim et al. | 117—22 X |
| 2,811,466 | 10/1957 | Samuel | 117—107.2 X |
| 3,001,893 | 9/1961 | Kreuchen et al. | 117—22 X |
| 3,096,205 | 7/1963 | De Guisto | 117—107.2 |

ALFRED L. LEAVITT, *Primary Examiner.*

MURRAY KATZ, *Examiner.*

A. GOLIAN, *Assistant Examiner.*